(12) United States Patent
Kalyadin et al.

(10) Patent No.: US 7,809,130 B1
(45) Date of Patent: Oct. 5, 2010

(54) PASSWORD RECOVERY SYSTEM AND METHOD

(75) Inventors: Oleg A. Kalyadin, Moscow (RU); Alexander G. Ivanov, Moscow (RU); Andrey V. Belenko, Moscow (RU)

(73) Assignee: Elcomsoft Co. Ltd., Moscow (RU)

( * ) Notice: Subject to any disclaimer, the term of this patent is extended or adjusted under 35 U.S.C. 154(b) by 1151 days.

(21) Appl. No.: 11/423,444

(22) Filed: Jun. 11, 2006

(51) Int. Cl.
*H04L 29/06* (2006.01)
*G06F 21/00* (2006.01)

(52) U.S. Cl. .................. 380/1; 380/286; 713/184; 726/6

(58) Field of Classification Search .............. 713/184, 713/186; 726/22, 25, 6; 380/2, 28, 44, 286, 380/1
See application file for complete search history.

(56) References Cited

U.S. PATENT DOCUMENTS 6,473,757 B1 * 10/2002 Garofalakis et al. ............. 1/1
7,149,801 B2 * 12/2006 Burrows et al. ............ 709/225
2004/0073815 A1 * 4/2004 Sanai et al. ................ 713/202
2007/0014416 A1 * 1/2007 Rivera et al. ................ 380/286

OTHER PUBLICATIONS

M. Abadi, M. Burrows, M. Manasse, and T. Wobber, "Moderately Hard, Memory-Bound Functions", ACM Transactions on Internet Technology, vol. 5, No. 2, May 2005, pp. 299-327.*
RFC 2898, "PKCS #5: Password-Based Cryptography Specification Version 2.0," Sep. 2000.*
Antoon Bosselaers et al., SHA: A Design for Parallel Architectures?, http://homes.esat.kuleuven.be/~cosicart/pdf/AB-9700.pdf (1997).
Antoon Bosselaers, Even Faster Hashing on the Pentium, http://homes.esat.kuleuven.be/~cosicart/pdf/AB-9701.pdf (1997).

* cited by examiner

*Primary Examiner*—Gilberto Barron, Jr.
*Assistant Examiner*—Virginia Ho
(74) *Attorney, Agent, or Firm*—Bardmesser Law Group

(57) ABSTRACT

A system, method and computer program product for recovering a password including, for each possible password to be tested, generating a periodicity unit based on a number of symbols in the password and a size of a chunk used by a one-way function to encrypt the password. The periodicity unit is substantially shorter than an input string, that includes replicated actual password used to encrypt the password. Based on the periodicity unit, using the one-way function, generating a control value for the periodicity unit. The control value is tested for a match with a control value generated from the actual password. An indication of a match is provided to a user.

13 Claims, 3 Drawing Sheets

US 7,809,130 B1

PASSWORD RECOVERY SYSTEM AND METHOD

BACKGROUND OF THE INVENTION

1. Field of the Invention

The present invention is related to cryptography, and, more particularly, to a faster method for recovery of passwords.

2. Description of the Related Art

Password recovery today is an important area of research and information security and information systems security. Recovering the password may be necessary in any number of circumstances.

For example, an encrypted disk drive may be recovered in the course of law enforcement operation, and the law enforcement agency may need to perform forensic recovery of the data stored on the disk drive. An encrypted message may be intercepted by a law enforcement agency, and needs to be decrypted. The password may have been created by a former employee, who is no longer available to open the document. Alternatively, the password may have been lost or forgotten, while the document still needs to be opened by the system administrator. Yet another situation involves the system administrator testing documents and their passwords to make sure that the users are not relying on relatively simple passwords, or easily discoverable passwords that rely on information about the users themselves (for example, the user's name, the user's spouse's name, their pet's names, their names spelled backwards, etc.). These are some of the circumstances where a system administrator may need to recover the password, without assistance from whoever chose that password.

A number of conventional methods are known for recovering passwords. These may be based on heuristics (information known or that can be guessed about the user), or on a brute-force approach of sequentially testing the password. Where no heuristics are available, the brute-force approach can take a very long time—at times, unacceptably long.

Accordingly, there is a need in the art for a fast system and method for recovering passwords.

SUMMARY OF THE INVENTION

Accordingly, the present invention is related to a system and method for rapid encrypted document recovery that substantially obviates one or more of the disadvantages of the related art.

In one aspect, there is provided a system, method and computer program product for recovering a password including, for each possible password to be tested, generating a periodicity unit based on a number of symbols in the password and a size of a chunk used by a one-way function to convert the password into a control value, such as a hash value. The periodicity unit is substantially shorter than an input string that includes replicated actual password used to convert the password into the control value. Based on the periodicity unit, and using the one-way function, generating a control value for the periodicity unit. The control value is tested for a match with a control value generated from the actual password. An indication of a match is provided to a user.

As one example, the one-way function can be, e.g., a hash function, such as a SHA-1 function, with the password being 6 symbols long, and the periodicity unit being 192 bytes long. The hash function can be, e.g., SHA-0, SHA-1, SHA-224, SHA-256, SHA-384 and SHA-512. The one-way function can be based on, e.g., Blowfish, Twofish, DES and AES cryptographic algorithms. The periodicity unit can optionally include a counter added to each instance of the possible password, or other artifacts used to lengthen the periodicity of the input string.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the embodiments of the present invention, examples of which are illustrated in the accompanying drawings.

Thus, the password protection and password recovery technologies complement each other, somewhat analogous to dual-use technology in the military context—protection of files and documents has both a benign purpose, and potentially a malicious one. Also, password recovery can have both useful and benign applications, as well as misuses.

One-way functions, such as functions based on cryptographic block ciphers (e.g., Blowfish, Twofish, AES, DES), or hash functions, have long been used as a mechanism for converting passwords into control values. Examples of commonly used hash functions are SHA-0, SHA-1, SHA-224, SHA-256, SHA-512, as well as many others. Most of the commonly used hash functions operate by converting an input string of an arbitrary length into a control value, known as the "hash value," which is of a specified length. Using the SHA-1 function as an example, the hash value is 160 bits long, which means that the number of possible hash values is $2^{160}$. This is, obviously, a very large number. Furthermore, most one-way functions used in cryptographic applications are such that a change of even one bit in the input string results in a completely different hash value at the output. Thus, while the hashing does not guarantee that two different inputs (for example, two different passwords, or two different files) will result in a unique hash value, with $2^{160}$ possible hash values, in practice, this is usually the case.

With the password (e.g., a six-symbol password) as the input string, the output is a hash value, for example, in the case of the SHA-1 function, a 160 bit value. Passwords, however, are rarely very long, with most systems using 6 or 8 symbol passwords, even though theoretically longer passwords can be used. In most cases, the limitation is not a technical one, but a practical one—requiring users to remember very long passwords, particularly passwords that are pseudorandom, or contain random numbers and/or letters, in addition to meaningful words, places a heavy burden on the user. Thus, many systems today rely on six-symbol passwords.

Figure 1:
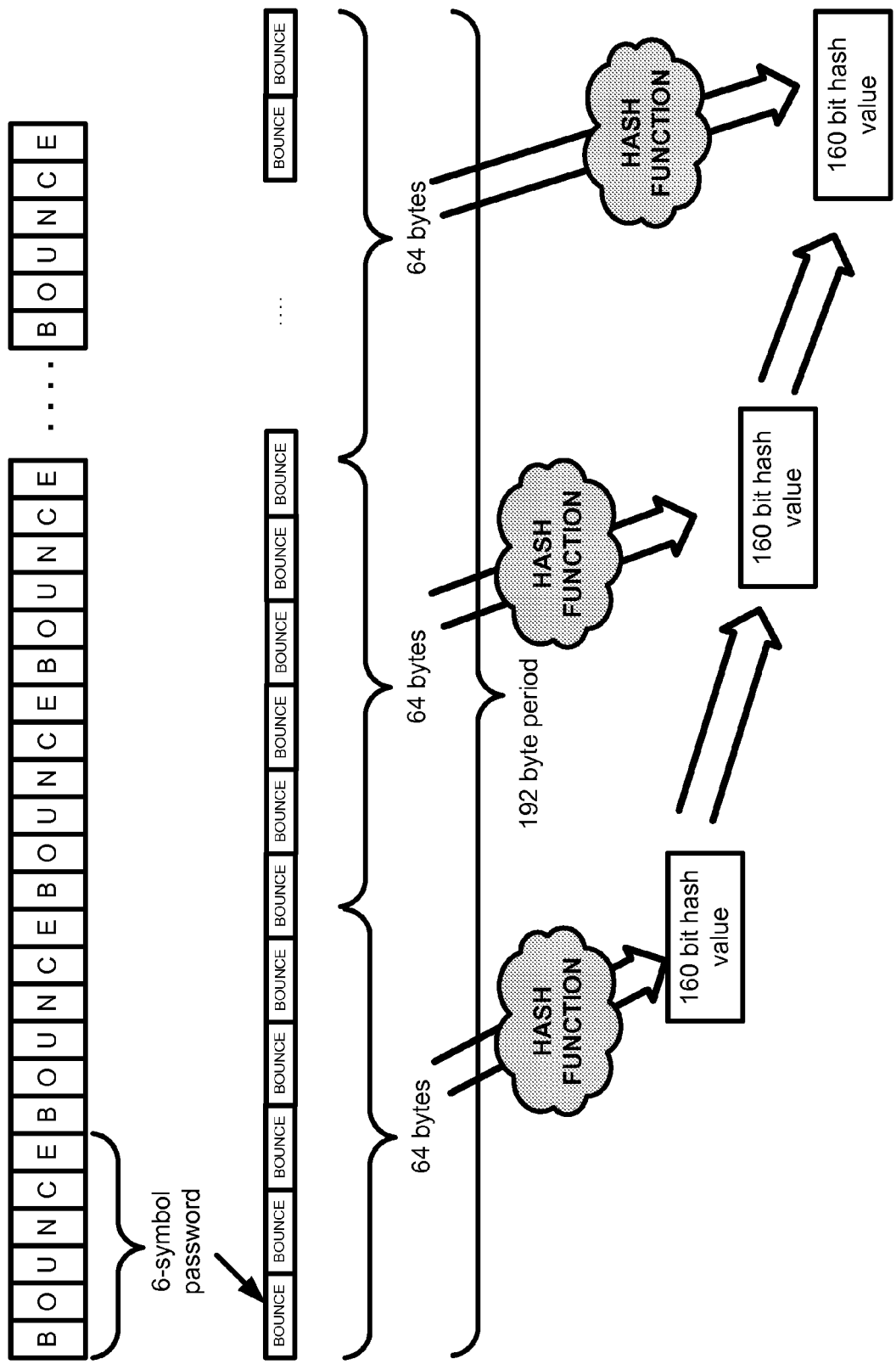
FIG. 1 illustrates one embodiment of the invention, with the SHA-1 hashing function as an example.

In order to make the job of breaking the password through vulnerabilities in the cryptographic or hashing algorithms more difficult, it is common to convert a password into a longer string through replication, often thousands, or tens of thousands, of times, so that the input string to the hash function becomes very long, sometimes several hundred thousand bytes. This prevents an easily brute-force approach to password breaking. This is also illustrated in FIG. 1, which shows how the hashing function works sequentially on each successive chunk.

For most hashing algorithms, such as SHA-1, the first hashing operation is performed on a first "chunk," which, in the case of the SHA-1 hashing function, is 64 bytes long. With SHA-1, each hashing operation consists of two sub-operations: (1) extending 64-byte chunk to 80-doubleword array and (2) mixing current hash value (chaining variables) with data from the 80-doubleword array. The next hashing operation is a mixing operation that utilizes the previous hash value (which is 160 bits for SHA-1) and the next 64 bytes of the input string.

It is worth noting that the hashing algorithm itself can be a computationally intensive one, depending on the particular hashing algorithm and the length of the input string. In the case where the password is replicated tens of thousands of times to form the input string, the hashing operation is very time consuming, particularly when it needs to be performed for a large number of possible passwords. For someone who needs to recover the password by testing each possible password for validity, the operation therefore consists of two steps—(1) converting a possible password into a hash value, and (2) testing the hash value using some cryptographic algorithm for validity, to see if a match occurs.

In other words, regardless of where the potential passwords come from—whether one is testing all possible passwords sequentially, or whether some heuristic is used, that permits focusing on some subset of all the possible passwords, the process is the same for each potential password—first, a hashing operation needs to be performed to generate the hash value, and then the hash value needs to be tested against a stored hash value, or used as a key to try to access a document, or otherwise verified that this is the right password (or not) to see if a match has been found.

The present invention therefore focuses on the first step of this operation, to enable a faster hashing for some hash algorithms. However, the hash algorithms at issue are ones that are most commonly used—such as MD5, SHA-1, SHA-256, etc. With reference again to FIG. 1, it will be observed that the input string for the hash function is formed by replicating a six symbol password (in this case, the word "BOUNCE") many times, often thousands or tens of thousands of times, depending on the settings of the password algorithm. It will be observed that the six symbol (in other words, six byte) password does not fit exactly into the "chunk" of the SHA-1 hashing algorithm, where the chunk is 64 bytes. However, taking three such 64 byte chunks together, which form a 192 byte long unit, and using a six symbol password, it will be observed that 32 six-byte passwords fit exactly into the 192 byte period. In other words, the periodicity of this password algorithm and this particular hashing function is 192 bytes—the minimum periodic unit length where both an integer number of chunks end and an integer number of passwords fit into a single periodic unit.

The key insight here is that there is only a need to perform the entire hashing operation on the first periodic unit (in this case, the 192 byte unit), while it is possible to dispense with part of the hashing computation that does not depend on the current hash value. For SHA-1 this part is the extension of the 64-byte chunk to the 80-doubleword array. This, obviously, reduces the total amount of time necessary for the password recovery algorithm, since the hashing process needs to only be performed on a much shorter input string. For example, in the case of a password that is replicated 10,000 times, assume extending takes 20% of hash computation time. It is necessary to compute the hash for 60000/64=938 hash chunks. A full hash calculation is performed on the first three chunks and on the last chunk. For the remaining 934 chunks, the faster method described herein can be utilized. This gives approximately 20% improvement in speed, in this. The degree of improvement, obviously, depends on the total length of the input string (i.e., how many times the password is replicated in the input string), and the length of the minimum periodic unit that can be identified. In general, depending on the hash function, the length of the input string and the minimum periodicity unit that can be identified, an improvement on the order of 20-50% can be expected.

Figure 2:
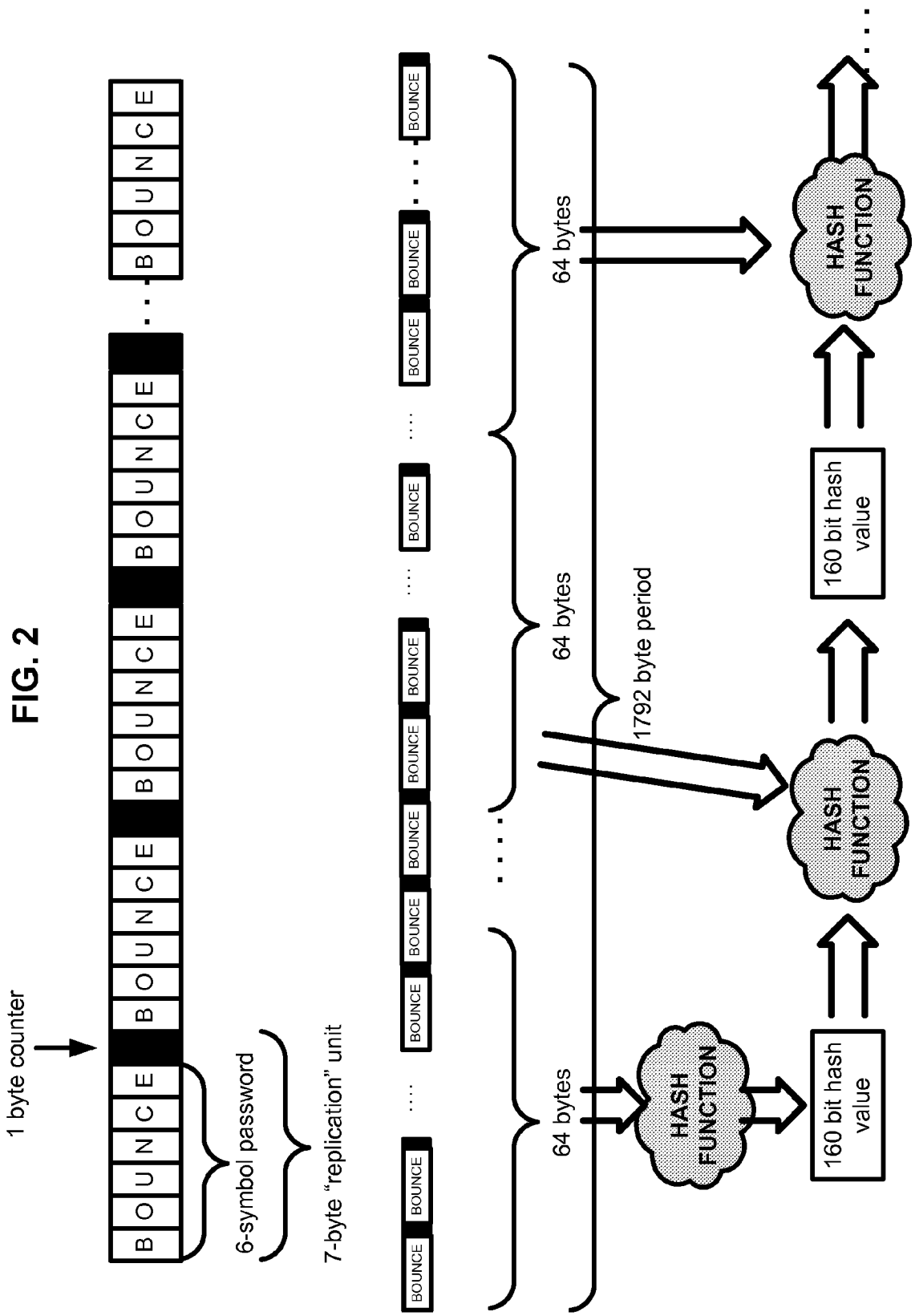
FIG. 2 illustrates another embodiment, where a counter is added to the input string of the replicated password.

Furthermore, it should be noted that many common password encryption algorithms take steps that in effect lengthen the minimum periodic unit. For example, a one byte counter can be added to each replica of the password, as shown in FIG. 2. Thus, each "basic unit" actually consists of the six-symbol password itself (in other words, six bytes) plus the one byte counter that is incremented by one each time. However, with a one byte counter, there are only $2^8$=256 possible counter Values—thus, the minimum periodic unit is 7×256=1792 bytes. In this case, 64-byte chunks fit integrally, 28 times, into 1792 bytes—therefore, the minimum-length periodic unit remains 1792 bytes long. In this case, obviously the degree of improvement would be less than in the case discussed above, but is still considerable, particularly for schemes that replicate the password tens of thousands of times, prior to hashing. In the most extreme case, for example, where two-byte or three-byte counters are used, there might not be any periodicity, and the method would not show any improvement—however, most practical password encryption schemes do not rely on such complex methodologies, and therefore are subject to the method described herein.

The text below is borrowed from WIKIPEDIA, an online encyclopedia resource that discusses hash functions. In particular, the pseudo code below is an algorithm for implementing the SHA-1 function. In the case of the present invention, the question is how many (or how few) "Extend the sixteen 32-bit words into eighty 32-bit words" loops need to be performed.

Pseudocode for the SHA-1 algorithm:

Note: All variables are unsigned 32 bits and wrap modulo $2^{32}$ when calculating. Initialize variables:

h0:=0x6 3452301 h1:=0xEFCDAB89 h2:=0x98BADCFE h3:=0x10325436 h4:=0xC3D2E1F0

Pre-processing:

append a single "1" bit to message append "0" bits until message length≡448≡−64 (mod 512)

append length of message (before pre-processing), in bits as 64-bit big-endian integer to message Process the message in successive 512-bit (64-byte) chunks:

break message into 512-bit (64-byte) chunks for each chunk
    break chunk into sixteen 32-bit big-endian words $w(i)$, $0 \leq i \leq 15$
    Extend the sixteen 32-bit words into eighty 32-bit words:
    for i from 16 to 79
        w(i):=(w(i-3) xor w(i-8) xor w(i-14) xor w(i-16)) leftrotate 1
    Initialize hash value for this chunk:
    a:=h0
    b:=h1
    c:=h2
    d:=h3
    e:=h4
    Main loop:
    for i from 0 to 79
    if $0 \leq i \leq 19$ then
        f:=(b and c) or ((not b) and d)
        k:=0x5A82 3999
    else if $20 \leq i \leq 39$
        f:=b xor c xor d
        k:=0x6ED9EBA1
    else if $40 \leq i \leq 59$
        f:=(b and c) or (b and d) or (c and d)
        k:=0x8F1BBCDC
    else if $60 \leq i \leq 79$
        f:=b xor c xor d
        k:=0xCA62C1D6
    temp:=(a leftrotate 5)+f+e+k+w(i)
    e:=d
    d:=c
    c:=b leftrotate 30
    b:=a
    a:=temp
    Add this chunk's hash to result so far:
    h0:=h0+a
    h1:=h1+b
    h2:=h2+c
    h3:=h3+d
    h4:=h4+e digest=hash=h0 append h1 append h2 append h3 append h4 (expressed as big-endian)

In the case of the SHA-1 function, and the six-symbol password replicated 10,000 times, the "extend" loop needs to be performed 60,000/64=937.5 times. However, with the present invention, in the example above (of a 192 byte periodicity unit), the "extend" loop needs to be performed only three times, resulting in a roughly 20% improvement with this example (and 20-50% for typical cases)—a significant result in the field of cryptography Although in the discussion above, hash functions were used as an example, the invention is not limited to hash functions. Any one-way function, where a previous function value is used to generate the next function value, can be used as well, as long as the input string has a periodicity that can be identified. Furthermore, in the case of hash functions, there are numerous examples of hash functions where the invention is applicable, such as SHA-0, SHA-1, SHA-224, SHA-256, SHA-384, SHA-512, to name only a few.

Password encryption scheme usually depends on particular product and is determined either by studying source files (if possible) or by means of reverse engineering. Most password schemes usually accept a wide range of password lengths.

Selection of the passwords to be tested can be on the basis of brute-force testing all the possible six-symbol combinations of all the symbols, or can be based on certain heuristics that rely on known information about the user. This can include such things as the user's first name, last name, spouse's or children's names, parents' names, Social Security numbers, names spelled backwards, pets' names, city names, addresses, etc.

Where such heuristic approaches fail, the next step might involve using a dictionary. For example, the English language contains approximately 20,000 words, including variations on the spelling, conjugations of words, singular/plural, etc. The applications that encrypt their files, such as MS Word, or Adobe Acrobat, provide functions for checking the validity of the password—in other words, it is not necessary to invoke the entire application in an attempt to open the document itself—it is possible to simply use that function and provide the possible passwords to it as an argument, resulting in a success or failure as the return parameter.

Other heuristics are also known, for example, many systems require that at least one letter of the password be a capital letter—and most users pick the first letter, and in some cases, the first two letters as capital letters, and the others as lowercase letters. Also, some systems require that a password have at least one digit—and most users pick the last one or two symbols in the password as the digits. All of these heuristics permit to significantly reduce the total number of passwords that need to be tested—however, the present invention works with any such scheme, whether heuristics are used, or whether all the possible passwords are tested sequentially one at a time.

Figure 3:
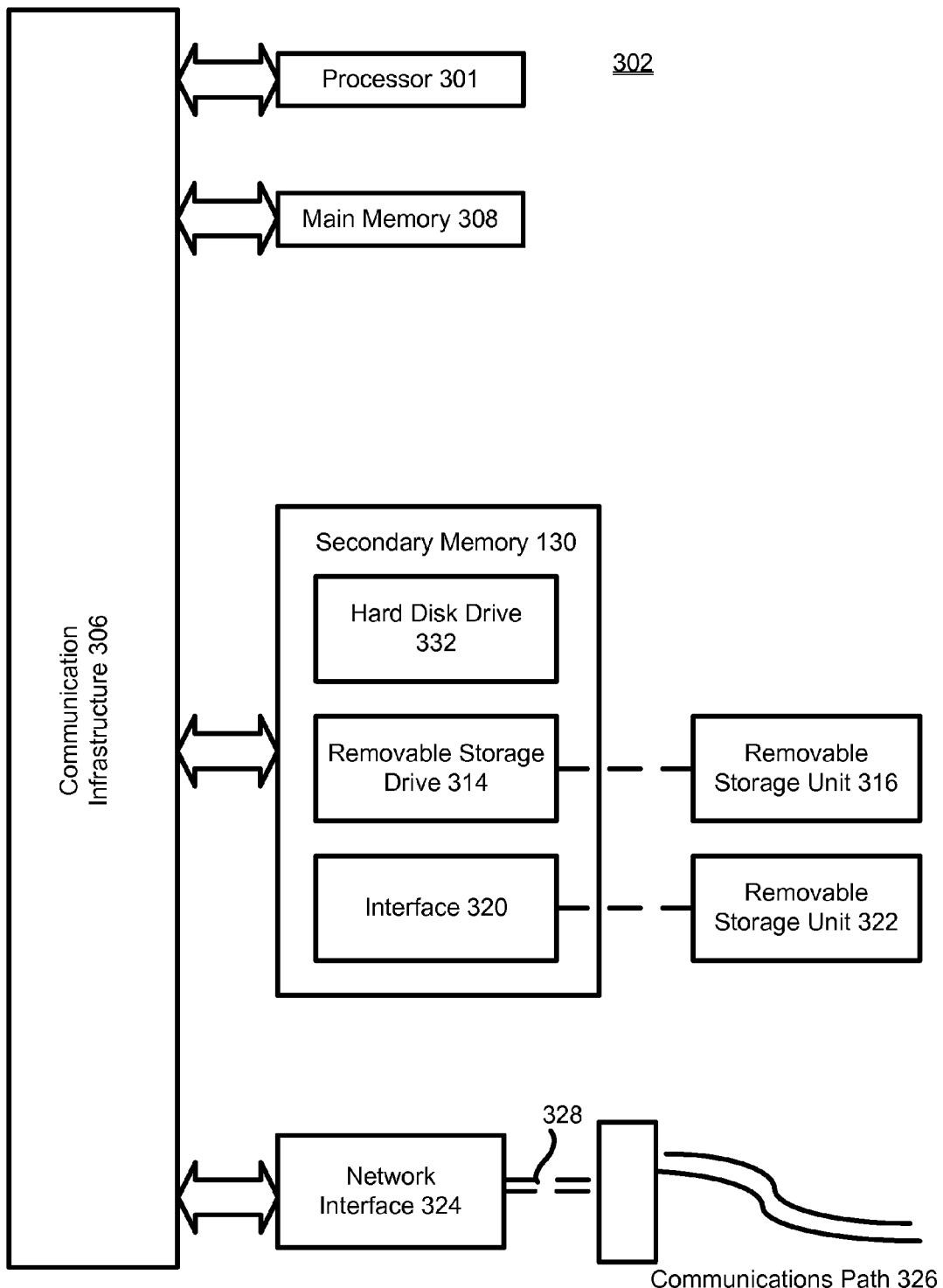
FIG. 3 is a schematic diagram of an exemplary computer or server that can be used in the invention.

An example of the computer system 302 on which the invention may be implemented is illustrated in FIG. 3. The computer system 302 includes one or more processors, such as processor 301. The processor 301 is connected to a communication infrastructure 306, such as a bus or network). Various software implementations are described in terms of this exemplary computer system. After reading this description, it will become apparent to a person skilled in the relevant art how to implement the invention using other computer systems and/or computer architectures.

Computer system 302 also includes a main memory 308, preferably random access memory (RAM), and may also include a secondary memory 310. The secondary memory 310 may include, for example, a hard disk drive 312 and/or a removable storage drive 314, representing a magnetic tape drive, an optical disk drive, etc. The removable storage drive 314 reads from and/or writes to a removable storage unit 318 in a well known manner. Removable storage unit 318 represents a magnetic tape, optical disk, or other storage medium that is read by and written to by removable storage drive 314. As will be appreciated, the removable storage unit 318 can include a computer usable storage medium having stored therein computer software and/or data.

In alternative implementations, secondary memory 310 may include other means for allowing computer programs or other instructions to be loaded into computer system 302. Such means may include, for example, a removable storage unit 322 and an interface 320. An example of such means may include a removable memory chip (such as an EPROM, or PROM) and associated socket, or other removable storage units 322 and interfaces 320 which allow software and data to be transferred from the removable storage unit 322 to computer system 302.

Computer system 302 may also include one or more communications interfaces, such as communications interface 324. Communications interface 324 allows software and data to be transferred between computer system 302 and external devices. Examples of communications interface 324 may include a modem, a network interface (such as an Ethernet card), a communications port, a PCMCIA slot and card, etc. Software and data transferred via communications interface 324 are in the form of signals 328 which may be electronic, electromagnetic, optical or other signals capable of being received by communications interface 324. These signals 328 are provided to communications interface 324 via a communications path (i.e., channel) 326. This channel 326 carries signals 328 and may be implemented using wire or cable, fiber optics, an RF link and other communications channels. In an embodiment of the invention, signals 328 comprise data packets sent to processor 301. Information representing processed packets can also be sent in the form of signals 328 from processor 301 through communications path 326.

The terms "computer program medium" and "computer usable medium" are used to generally refer to media such as removable storage units 318 and 322, a hard disk installed in hard disk drive 312, and signals 328, which provide software to the computer system 302.

Computer programs are stored in main memory 308 and/or secondary memory 310. Computer programs may also be received via communications interface 324. Such computer programs, when executed, enable the computer system 302 to implement the present invention as discussed herein. In particular, the computer programs, when executed, enable the processor 301 to implement the present invention. Where the invention is implemented using software, the software may be stored in a computer program product and loaded into computer system 302 using removable storage drive 314, hard drive 312 or communications interface 324.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A computer-implemented method of recovering a password, the method comprising:
   (a) for a possible password to be tested, determining a length of a periodicity unit based on a number of symbols in the possible password and a size of a chunk used by a one-way function to convert the possible password into a test control value,
   wherein the length of the periodicity unit is shorter than an input string, that includes replicated possible password used to convert the possible password into the test control value;
   (b) setting an initial one-way function state;
   (c) for a first chunk in a first periodicity unit, extending the first chunk;
   (d) storing the value of the extension of the first chunk of the first periodicity unit;
   (e) updating the one-way function state using the value of the extension of the first chunk of the first periodicity unit;
   (f) repeating steps (c)-(e) for other chunks of the first periodicity unit;
   (g) for a first chunk of a second periodicity unit, updating the one-way function state using the stored value of the extension of the first chunk of the first periodicity unit;
   (h) repeating step (g) for other chunks of the second periodicity unit with corresponding stored values of the extensions of the chunks of the first periodicity unit;
   (i) repeating steps (g) and (h) for all remaining periodicity units;
   (j) extending a last chunk of the input string;
   (k) updating the one-way function state with a value of the extension of the last chunk, to generate the test control value;
   (l) testing the test control value for a match with a control value generated from an actual password;
   (m) repeating steps (a)-(l) for other possible passwords until a match is found; and
   (n) providing, to a user, indication of the match.

2. The method of claim 1, wherein the one-way function is a hash function.

3. The method of claim 2, wherein the hash function is a SHA-1 function, the possible password is 6 symbols long, and the length of the periodicity unit is 192 bytes long.

4. The method of claim 2, wherein the hash function is any of SHA-0, SHA-1, SHA-224, SHA-256, SHA-384, and SHA-512.

5. The method of claim 1, wherein the one-way function is based on any of Blowfish, Twofish, AES and DES cryptographic algorithms.

6. The method of claim 1, wherein each periodicity unit includes a counter added to each instance of the possible password.

7. A non-transitory computer useable medium having computer program code stored thereon for executing on a processor, the computer program code for implementing the method of claim 1.

8. A system for recovering a password, the system comprising:
   (a) for a possible password to be tested, means for determining a length of a periodicity unit based on a number of symbols in the possible password and a size of a chunk used by a one-way function to convert the possible password into a test control value,
   wherein the length of the periodicity unit is shorter than an input string, that includes replicated possible password used to convert the possible password into the test control value;
   (b) means for setting an initial one-way function state;
   (c) for a first chunk in a first periodicity unit, means for extending the first chunk;
   (d) means for storing the value of the extension of the first chunk of the first periodicity unit;
   (e) means for updating the one-way function state using the value of the extension of the first chunk of the first periodicity unit;
   (f) means for repeating steps (c)-(e) for other chunks of the first periodicity unit;
   (g) for a first chunk of a second periodicity unit, means for updating the one-way function state using the stored value of the extension of the first chunk of the first periodicity unit;
   (h) means for repeating step (g) for other chunks of the second periodicity unit with corresponding stored values of the extensions of the chunks of the first periodicity unit;

(i) means for repeating steps (g) and (h) for all remaining periodicity units;
(j) means for extending a last chunk of the input string;
(k) updating the one-way function state with a value of the extension of the last chunk, to generate the test control value;
(l) means for testing the test control value for a match with a control value generated from t-he an actual password;
(m) means for repeating steps (a)-(l) for other possible passwords until a match is found; and
(n) means for providing, to a user, indication of the match.

9. The system of claim 8, wherein the one-way function is a hash function.

10. The system of claim 9, wherein the hash function is a SHA-1 function, the possible password is 6 symbols long, and the length of the periodicity unit is 192 bytes long.

11. The system of claim 9, wherein the hash function is any of SHA-0, SHA-1, SHA-224, SHA-256, SHA-384, and SHA-512.

12. The system of claim 8, wherein the one-way function is based on any of Blowfish, Twofish, AES and DES cryptographic algorithms.

13. The system of claim 8, wherein each periodicity unit includes a counter added to each instance of the possible password.

\* \* \* \* \*